Feb. 6, 1945. H. HANSON ET AL 2,368,828
PROCESS FOR PRODUCING CARBON BLACK
Filed April 21, 1941
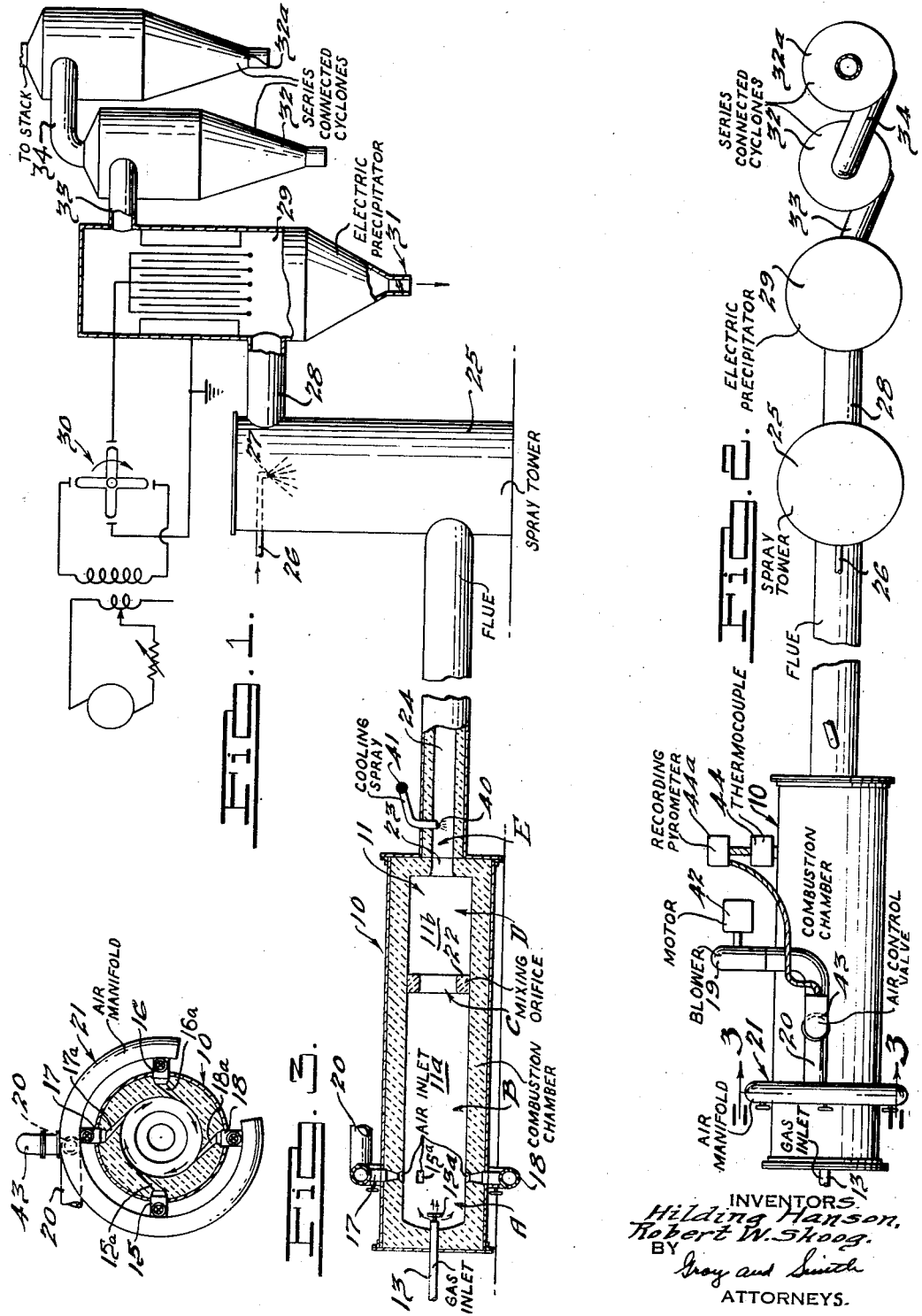

Patented Feb. 6, 1945

2,368,828

UNITED STATES PATENT OFFICE 2,368,828

PROCESS FOR PRODUCING CARBON BLACK

Hilding Hanson, Charleston, W. Va., and Robert W. Skoog, Borger, Tex., assignors to United Carbon Company, Inc., Charleston, W. Va., a corporation of Maryland Application April 21, 1941, Serial No. 389,523

11 Claims. (Cl. 23—209.8)

The present invention relates to a new and useful process for producing hydrocarbon products relating more particularly to a process for effecting, in an improved manner, incomplete combustion of natural gas to produce the hydrocarbon products commonly referred to as "chemical carbon," "colloidal carbon," "carbon black," "gas black" or "soft black," all of which materials are included in the term "carbon black" as used herein.

Processes previously known for producing carbon black from a hydrocarbon gas or mixtures thereof, such as natural gas, fall into three general classifications as follows:

(1) The so-called "impingement" processes in which a flame produced by burning natural gas with a supply of air insufficient to support complete combustion is impinged on a cool metallic collecting member usually in the form of a channel, disk or roller usually formed of a ferrous metal.

(2) The so-called "soft black" processes in which the natural gas and air are heated by contact with heated refractory surfaces to effect its decomposition.

(3) The so-called "soft black" processes in which separate streams of fuel gas and process gas are processed within a furnace by avoiding intermixing and turbulence of the streams. The fuel gas which is burned is utilized to heat adjacent streams or stratified layers of the process gas which is thermally decomposed or "cracked." There is little or no combustion of the process gas since the burning streams of heating gas contiguous thereto consume the oxygen which would be required for supporting combustion of the process gas.

The above-described impingement processes and soft black processes have certain disadvantages, the impingement processes because of the relatively low yields of carbon black and the soft black processes because of the gray color and relatively poor rubber reinforcing properties of the carbon black so produced.

Heretofore the art has sought to devise a process for producing a desired type of carbon black from hydrocarbon gases, which process could be controlled readily to produce, as desired, a predetermined type of black having properties required for a particular contemplated commercial use and which process could be adapted to produce other types of carbon black by a relatively simple adjustment of the operating controls. It is an object of the present invention to provide such a process.

It is another object of the invention to provide a novel and improved process for producing carbon black from a hydrocarbon gas, the process being readily controllable to produce a carbon black having many of the useful characteristics of a hard or impingement black, and which also possesses many of the useful characteristics of blacks produced by the soft black processes.

A further object of the invention is to provide a process which is readily controllable to produce blacks of different desired types.

Still another object of the invention resides in the provision of a process which may be operated as a continuous process without interruption for heating a refractory or other body within a chamber, or the cleaning or scavenging of the chamber.

Another object of the invention is to provide a process for the production of a relatively high yield of commercially valuable carbon black, the process being readily controllable and capable of being carried out commercially in a plant which is relatively economical to construct and operate.

Other objects and advantages of this invention will appear in the following description and appended claims, reference being made to the accompanying drawing forming a part of this specification wherein like reference characters designate corresponding parts in the several views. In the drawing, which comprises diagrammatic views indicating one suitable way of practicing the present process:

Fig. 1 is an elevation, partially in section, showing in a schematic layout of one embodiment of the invention, a flow sheet of the present novel process;

Fig. 2 is a plan view of the arrangement shown in Fig. 1; and

Fig. 3 is a section taken substantially on the line 3—3 of Fig. 2, looking in the direction of the arrows.

Before explaining in detail the present invention, it is to be understood that the invention is not limited in its application to the details of construction and arrangement of parts illustrated in the drawing since the invention is capable of other embodiments and of being practiced in various ways. In particular, the apparatus indicated in the drawing represents but one way of carrying out the present process. Other ways of so doing are contemplated herein. In this connection, reference is hereby made to co-pending application Serial No. 389,522, in which a detailed description and explanation is given of one form of converter designed to carry out the present process. The process per se, independently of any specific form of apparatus, possesses many features of novelty which constitute the subject matter of the present application. It is to be understood that since the process is capable of being carried out in other apparatus, the present invention is not to be limited to the particular forms of apparatus here shown and described.

In general, the process of the present invention utilizes a turbulent mixture of air and a hydrocarbon gas, such as natural gas, in such proportions that a partial combustion of the natural gas is effected. The volume, velocity and direction of the air and gas are so adjusted and correlated that a partial combustion reaction occurs in a vigorous, swirling mass of flame which moves through the converter at a relatively high velocity. The extent of combustion permitted regulates the temperature of the reaction and the type and yield of carbon black which is produced. Regulation of the air-gas ratio controls the extent of the combustion.

In carrying out the process of the present invention, a regulated quantity of hydrocarbon gas is supplied at one end of a substantially horizontal converter and is mixed with air in regulated amounts less than that required for the complete combustion of the hydrocarbon. Upon traveling through the converter, the air and gas are mixed and some of the hydrocarbon gas is burned and the remainder of the hydrocarbon gas is dissociated with the production of carbon black and gaseous products.

During the passage through the converter, the unburned hydrocarbon gases are decomposed while admixed with the hot gaseous products of combustion.

The hydrocarbon gas, the air and the gaseous products of combustion are thoroughly mixed in the converter so that all portions of the hydrocarbon gas are heated to the decomposition temperatures.

During the combustion and the decomposition of the hydrocarbon gas, the reactions are not modified or checked by contact with relatively cold surfaces as in the impingement processes. There is no stratification of the hot combustion gases and the hydrocarbon gases as in certain of the known soft black processes. The heat which is necessary to decompose the hydrocarbon gas to produce carbon black is transferred directly to such gas from the heated products of combustion.

A process of the present invention may be carried out as shown in the schematic drawing in which the reference numeral 10 indicates, in general, a refractory lined converter having a combustion chamber 11. The converter 10 may be of any suitable construction such, for example, as a steel casing or shell lined with fire brick or other suitable heat-resisting refractory material.

The reference numeral 13 indicates an inlet conduit for the hydrocarbon gas and extends into the combustion chamber 11. A baffle 13a is spaced from the end of the inlet conduit 13 and directs the gas flowing through the conduit 13 towards the peripheral walls at the front end of the combustion chamber 11. The baffle 13a may be in the form of a spaced cap member which provides a plurality of side ports between it and the end of the inlet conduit 13, or it may be a perforated cap or plate. The purpose of the baffle 13a is to facilitate the mixing of the gas with the air admitted to the converter 10. If desired, a plurality of similar baffled gas inlets may be provided in the front end of the converter. The sizes and number of such inlets are determined by the capacity of the converter and the gas rate and air-gas ratio selected.

For purposes of the present processes, it is contemplated that any suitable hydrocarbon or mixture of hydrocarbons, such for example as natural gas capable of being thermally decomposed to yield carbon black, may be introduced or injected into the chamber 11 through the gas inlet 13. Due to the varying percentages of methane, ethane, propane, and other hydrocarbon gases in natural gas, it is to be understood that the process is to be regulated with regard to the composition of the particular gas used so as to produce a substantially uniform commercial product.

According to the present process, a suitable oxidizing medium, such as air, is introduced into the combustion chamber and is admixed therein with the gas to be decomposed. This oxidizing medium is introduced preferably at a plurality of points spaced circumferentially about the combustion chamber, such as the points shown at 15, 16, 17 and 18. It will be noted that these points, as illustrated in the drawing, are spaced circumferentially about the combustion chamber and terminate at points spaced radially with respect to the baffle 13a on the end of the gas inlet 13. While this particular circumferential spacing and arrangement of the points at which the oxidizing medium is injected into the converter comprise a preferred arrangement, it is to be understood that other arrangements of the points of introduction of the oxidizing medium may be utilized. For example, these points may be spaced longitudinally along one side of the combustion chamber. In general, these points for introducing air into the chamber 11 are arranged so that they are spaced from each other in such a manner that the oxidizing medium is introduced into the chamber at a plurality of spaced points.

In the drawing, four air inlet ports are shown. This number may be varied as desired. It has been found that six ports equally spaced about the circumference of the converter under certain conditions are more satisfactory than are the four ports here shown. Likewise, a larger number of ports than six, for example, sixteen, has been found desirable for some operating conditions. Thus we do not desire to be limited to the use of any particular number of air inlet ports since this is a factor which can be determined only with regard to the contemplated operation of the process and design of the converter.

It is desirable that the air from the ports 15, 16, 17 and 18 be discharged inside the converter 10 as generally tangential air streams, moving at such a velocity as to move circumferentially along the walls of the combustion chamber, as indicated by the arrows in Fig. 3. Thus, we provide a plurality of directional air ports or passages 15a, 16a, 17a and 18a, which communicate with the radial air ports 15, 16, 17 and 18 and with the interior of the converter 10. The longitudinal axes of the air ports or passages 15a, 16a, 17a and 18a are preferably tangential to the inner circumference of the combustion chamber 11. While a generally tangential arrangement is preferred, it is not essential to the satisfactory operation of the process that the air ports or passages 15a, 16a, 17a and 18a be exactly tangential. Some variation in this regard is permissible as long as a direction is imparted to the air streams which cause them to wipe the inner walls of the combustion chamber 11.

The selection of sizes, numbers and placement of the air inlet ports is controlled to provide a substantially uniform distribution of the air inside the converter 10 at air pressures which requires a relatively low power consumption. The spacing of the ports and the tangential velocity of the air determine to a large extent the uniformity of the air distribution, while the sizes and number of the ports affect the air pressures required to deliver a given volume of air during a given time interval. The desired volume of air to be delivered through the ports in a given time interval is regulated to provide the desired temperatures.

It has been found that the circumferential placement of the ports is preferable in some respects to a longitudinal placement thereof. This is true particularly where space is an important factor, since the use of circumferentially spaced ports permits the use of a more compact air distributing system than does the use of the longitudinally spaced ports.

The air ports 15, 16, 17 and 18 are connected with a header, indicated generally by the numeral 21, which is supplied with air under controlled pressures through the duct 20 connected with a blower indicated at 19 (Fig. 2).

The flow of air through the duct 20 is regulated by an automatic valve 43 of any desired conventional construction, which is electrically connected through a recording pyrometer, indicated at 44a, which in turn is electrically connected with a thermocouple 44 which extends into the converter. Air under pressure is supplied to the duct 20 by the power-driven blower 19 which is driven by a motor 42. The valve 43 is actuated according to the temperatures in the converter. If the temperatures are too high, the valve 43 is caused to close and cut off some of the air, thus reducing the amount of combustible mixture in the converter. If the temperatures are too low, the valve 43 is caused to open and admit additional air to increase the amount of combustible mixture in the converter.

The hydrocarbon gas introduced through the gas inlet 13 is mixed with the generally tangential air streams discharged into the furnace through air ports or passages 15a, 16a, 17a and 18a. This mixing and the combustion of the air and gas mixture create a turbulent mass of gas, air and products of combustion which fills the combustion chamber 11 and moves towards the outlet of the converter as a swirling, turbulent mass. It is to be understood that any preferred means of injecting the air or other oxidizing medium into the chamber may be employed as long as the air or other oxidizing medium causes a turbulent admixture of the air, the products of combustion and the hydrocarbon gas. Due to this turbulent flow of the air, products of combustion and gas, there is no stratification of the gas and products of combustion in the combustion chamber.

In order to insure a complete mixing of the gases, a mixing orifice 22 is provided in the converter. In one satisfactory embodiment it is placed at a point preferably somewhat nearer the converter outlet 23 than it is to the gas inlet 13. However, the mixing orifice 22 may be placed where required to cause the desired mixing of the gases. While any suitable type of mixing orifice may be utilized, the preferred structure consists of the annular orifice member shown, which has a generally centrally positioned opening.

The burning gases, after passing through the mixing orifice 22 in the converter, continue to burn in the portion of the converter on the outlet side thereof and are withdrawn from the combustion chamber through the converter outlet 23 which consists of a refractory lined opening connected with a refractory lined flue 24.

As the gases travel through the flue 24, they are subjected to cooling by spraying with a water spray 40 which is controlled by the valve 41. The temperature drop thus caused in the gases preferably should be from approximately 200° to 500° F., depending on the temperatures of the gases at the time of cooling and the type of carbon black being manufactured. The controlling factor is that after the gases are sprayed, they shall have a temperature of approximately 1900° F. or less as they pass from the water spray 40. The flue 24 preferably is lined with refractory and may, if desired, be heat insulated to minimize the heat loss in the gases as they traverse the flue 24. It is desirable that the temperature drop in the flue 24 be limited so as not to exceed approximately 20% to 25% of the temperature of the gases as they leave the water spray 40. For example, if the gases enter the flue 24 at a temperature of approximately 1900° F., the reduction of temperature in the flue 24 should not exceed approximately 380° to 475° F. With such conditions, the velocity of the gases in the flue 24 is maintained so that there is no separation of carbon black in the flue 24 which would require shut down of the plant and blowing of the flue 24 with air. The gases from the flue 24 then pass into a vertical quenching tower 25 where they flow upwardly through a quenching spray 27 of water supplied through the pipe 26. Here the temperature of the gases is dropped to approximately 425° to 450° F.

Any suitable means of introducing a cooling fluid may be utilized in the flue 24 and the tower 25 and any type of jet or other means for creating a spray of the fluid may be employed.

The cooled gaseous products of combustion are withdrawn from the tower 25 through the conduit 28, which is connected with any suitable means for separating and collecting the carbon black carried in the gases resulting from the treatment in the converter. Carbon separating and collecting equipment of various types are well known in the art and any desired type may be employed in the present invention. For example, an electric carbon agglomerator or precipitator of any desired type, such for example as that shown at 29, may be employed and the conduit 28 may lead directly into said precipitator.

Since the construction and operation of electric precipitators are well known in the art, a detailed description thereof is not given herein. However, generally speaking, such precipitators utilize alternately positioned plates and rods or wires which are respectively charged with relatively high voltages of positive and negative electric currents. These plates, rods or wires are connected with a suitable electric circuit for producing such voltages, as indicated schematically at 30 (Fig. 1). The electric precipitator operates to effect flocculation and the formation of agglomerates of carbon black which separate from the carrying gases. With some types of black an appreciable amount of the agglomerated black will separate from the gases and fall toward the bottom of the precipitator. With other types of black, a relatively small amount of the agglomerated black will separate from the gases at this point. The products of combustion are withdrawn from the precipitators and passed to supplemental means for separating and collecting the agglomerated or flocculated carbon black from the carrying gases. For example, series connected cyclones, as shown at 32 and 32a, may be connected to the electric precipitator by the connecting conduit 33, and the exhaust gases from the electric precipitator will pass through the cyclones 32 and 32a where the carbon black is separated from the gases before they are discharged to the stack 34. The construction and operation of such cyclones are well known in the art so that a detailed description thereof is not given herein.

It will be understood that the above-described arrangement of carbon black separating and collecting means constitute but one preferred arrangement and that other well-known carbon black separating and collecting means may be employed. For example, a conventional type of bag separator may be utilized and directly connected to the conduit 28 leading from the cooling tower, or an electric precipitator may be used ahead of a bag separator. Also, a cyclone, or series of cyclones, may be used in connection with such bag separator or filter.

From the foregoing, it will be seen that the converter 10 is essentially a reaction chamber in which there are a series of zones indicated generally by the letters A, B, C and D. These zones vary in size and extent with the adjustment of the air and gas ratio and with the particular form of air injection system employed. In general, however, they occupy the relative positions indicated on the drawing by such letters.

The initial zone A is a mixing zone in which the gas and air, which enter the zone at approximately atmospheric temperatures, are mixed and subjected to rapid heating to the desired reaction temperatures.

The second zone B is a zone of initial reaction. Here the gas and air mixture is burned at a regulated temperature to initiate the decomposition of the gas.

The third zone C is the mixing orifice zone where the hot products of combustion and the remaining air and the undecomposed hydrocarbon gases and the decomposing gases are blended and mixed to assure a full utilization of all oxygen then present and a completion of the desired combustion of the air-gas mixture.

The fourth zone D is a refining zone in which the gases and the entrained carbon which pass through the mixing orifice zone are subjected to heat treatment for a predetermined time and at a predetermined temperature. From the refining zone the gases pass through the stack outlet 23 to the flue 24 where they are cooled as previously described.

The air and gas mix to form a combustible or partially combustible mixture, and this mixture is burned with a turbulent active flame. The entire converter is filled with the resultant flame and products of combustion and partial decomposition of the gas. Due to the relatively large volume of air, its relatively high velocity and the tangential direction by which it enters the converter, the air tends to provide a blanket or sheath, chiefly of inert gases, between the refractory of the converter and the turbulent flame therein. The gas blanket or sheath is broken up and mixed with the gases during their passage through the mixing orifice zone C. Thus, by the time the gases pass to the refining zone D, any oxygen then present in the air blanket or sheath is available to complete the desired reaction in the refining zone D. Due to this arrangement, the present process may be operated as a continuous process without requiring intermittent or cyclic operation, one cycle of which is given over entirely to the removal of coke or deposited carbon formed in the converter during a preceding heat treatment of the carbon containing gas.

According to the present process, the quantities of hydrocarbon gas and air introduced into the combustion chamber are controlled and the proportions carefully regulated to produce a decomposition of the hydrocarbon gases inside the converter. By controlling the quantity of air and gas introduced into the converter, it is possible not only to produce a relatively high yield of carbon black per unit of gas processed, but also to produce, as desired, carbon black having certain desired chemical and physical characteristics.

The regulation of the quantity and distribution of air introduced with respect to a given quantity of gas introduced, controls the temperatures within the converter. This temperature control and control of the reaction causing such temperatures, are important factors which determine the type of carbon black to be produced, as well as the yield thereof.

Specific examples of such temperature controls are given hereinafter. A general guide for such control of the process has been developed from many experiments. For the production of those carbon blacks which appear to possess the most desirable characteristics as to color and rubber reinforcing properties as well as yield, the total amount of air introduced into the converter should be regulated to produce a temperature which does not exceed approximately 2750° F. at its maximum which is reached adjacent the mixing orifice 22. The temperature of the gases in the portion of the converter on the inlet side of the orifice 22 decreases toward the gas inlet 13. The temperature of the gas and air at the gas inlet 13 is approximately atmospheric but is raised almost instantly to an elevated temperature. If desired, the gas and air, or either of them, may be heated prior to being introduced into the converter. One method of accomplishing such heating is to provide a heat exchange between the hot gases in the flue and the gas or air to be fed to the converter. Depending upon the type of carbon black which it is desired to produce, this initial elevated temperature varies from approximately 1000° F. to approximately 2350° F. An increasing temperature gradient is provided in the reaction zone B which extends from the mixing zone A to the orifice 22. The upper limit of this temperature gradient is preferably reached at a point adjacent the mixing orifice 22. The temperatures in the reaction zone B will vary depending on the type of black to be produced and will vary within the range of approximately 2000° F. to 2650° F. The decomposition of the gas is continued at temperatures approaching 2650° F. in the refining zone D. This heating not only permits the decomposition of the gas to go forward, but also improves the quality of the carbon black previously formed. The temperatures in the refining zone D will vary, depending on the type of black to be produced. In general, however, the preferred temperatures in the zone D lie within the range of approximately 2350° to approximately 2750° F.

This temperature gradient may be varied as desired by control of the air-gas ratio, preferably by controlling the amounts of air introduced at the air inlet ports. However, if desired, the control may be effected by varying the gas while maintaining a substantially constant air rate. Since the temperature of the reaction controls the type of carbon black which is produced by the process, that range of temperatures should be selected which will produce the desired type of carbon black.

made and are intended only as examples of preferred operations of the present process.

The data shown in the following chart was compiled using natural gas from the Borger field in the North Texas Panhandle. The gas used had an average composition by volume of:

|  | Per cent |
| --- | --- |
| Methane | Approx. 85.3 |
| Ethane | Approx. 5.0 |
| Propane | Approx. 3.4 |
| Butane | Approx. 1.5 |
| Pentane plus | Approx. 0.9 |
| Nitrogen | Approx. 3.3 |
| Oxygen | Approx. 0.4 |
| $CO_2+H_2S$ | Approx. 0.2 |
|  | 100.0 |

Using the gas and the air ratios shown in the following chart, desirable results were achieved both as to the amounts and quality of carbon black produced.

| Types of carbon black produced | Gas rate cu. ft. per 24 hours | Ratio of air to gas (approx.) | Temperatures (degrees F.) | | | | | Yield lbs. carbon black per 1,000 cu. ft. gas |
| --- | --- | --- | --- | --- | --- | --- | --- | --- |
| | | | Zone A | Zone B | Zone C | Zone D | Point E | |
| 2-X-1 | 124,000 | 5.0:1 | 2,350 | 2,615 | 2,595 | 2,450 | 2,350 | 8.4 |
| 2-X-1 | 83,600 | 5.4:1 | 2,260 | 2,505 | 2,520 | 2,380 | 2,300 | 8.1 |
| 2-X-2 | 168,000 | 5.8:1 | 1,540 | 2,100 | 2,085 | 2,520 | 2,415 | 6.5 |
| 2-X-2 | 200,000 | 6.1:1 | 1,500 | 2,060 | 2,065 | 2,530 | 2,465 | 6.3 |

In the following chart the results of representative runs are given for the purpose of indicating the yields of carbon black produced. The chart also shows the air and gas ratios used and the preferred temperature ranges and gradients for the production of the desired type of carbon black. From a consideration of this chart, it will be noted that the improved process of the present invention yields from approximately 6.3 to approximately 8.4 pounds of carbon black per thousand cubic feet of total gas used. One type of carbon black thus produced is a novel product not previously known in this art and is disclosed and covered as such in co-pending application Serial No. 406,916 in the names of Hilding Hanson, Robert W. Skoog and Isaac Drogin. This product is referred to in the accompanying chart as 2-X-2. Another type of carbon black produced by the present process and shown on the following chart is comparable to the soft black commercially known as "Gastex," which is sold by the General Atlas Carbon Company. This product is identified on the following chart as 2-X-1.

In the following chart it will be noted that the temperatures for each run are given at points in the combustion chamber corresponding generally to the zones "A," "B," "C," "D" and at point "E" in the flue 24 in Fig. 1.

It will be understood that in practicing the present process, the amount of air entering the furnace or converter is so controlled that the operating temperature in each of the zones A, B, C, D and at the point E, conforms generally to the temperatures given for each of those zones and point E on the chart. In this manner, the process may be controlled to produce the approximate yields indicated on the chart for each type of carbon black produced. It is also to be understood that the runs selected for use on this chart are typical of numerous runs previously From the foregoing, it will be seen that we have provided a novel process for producing carbon black from gaseous hydrocarbons, which process comprises burning a predetermined admixture of gas and air in a converter to effect decomposition of a portion of the gas, and thereafter separating the produced carbon black from the resultant gaseous products. The yield and character of carbon black are controlled by regulating the relative proportions of gas and air utilized and by thus controlling the temperatures within the converter. As has been shown, the process may be thus regulated to produce either new types of carbon black or carbon blacks which are comparable to certain commercially known soft blacks.

We claim:

1. A process for producing carbon black from a hydrocarbon gas by a series of progressive reactions in an elongated cylindrical chamber, which comprises introducing the hydrocarbon gas at one end of said chamber, introducing air at spaced points in the side walls of said chamber, directing the air circumferentially of said chamber to form a turbulent admixture of said gas and air, progressively burning a portion of said gas and air to provide progressively increasing temperatures at predetermined zones within the combustion chamber thereby to decompose the unburned portion of said hydrocarbon gas and liberate carbon black therefrom, thereafter cooling the gaseous products of combustion and decomposition, and separating the carbon black therefrom.

2. A process for producing carbon black from a hydrocarbon gas by a series of progressive reactions in an elongated cylindrical chamber, which comprises introducing the hydrocarbon gas at one end of said chamber, providing a body of air in an amount of approximately 5 to 6.1 parts for each part of hydrocarbon gas, introducing said air into the chamber at spaced points in the side walls thereof while directing the air circumferentially of said chamber to form a turbulent admixture of said gas and air, progressively burning a portion of said gas and air to provide progressively increasing temperatures at predetermined zones within said combustion chamber to decompose the unburned portion of said hydrocarbon gas and liberate the carbon black therefrom by first subjecting the said gas to a temperature within the limits of approximately 1000° F. to approximately 2350° F. in an initial mixing zone, then subjecting the hydrocarbon gas to a temperature within the limits of approximately 2000° F. to approximately 2650° F. in a reaction zone, blending said gases in a mixing orifice and thereafter subjecting them to further treatment at a temperature within the limits of approximately 2350° F. to approximately 2750° F. in a refining zone, thereafter cooling the gaseous products of said combustion and decomposition, and separating the carbon black therefrom.

3. A process for producing carbon black from a hydrocarbon gas by a series of progressive reactions in an elongated cylindrical chamber, which comprises introducing the hydrocarbon gas at one end of said chamber, providing a body of air in an amount of approximately 5 to 6.1 parts for each part of hydrocarbon gas, introducing said air into the chamber at spaced points in the side walls thereof while directing the air circumferentially of said chamber to form a turbulent admixture of said gas and air, progressively burning a portion of said gas and air to provide progressively increasing temperatures at predetermined zones within said combustion chamber to decompose the unburned portion of said hydrocarbon gas and liberate the carbon black therefrom by first subjecting the said gas to a temperature within the limits of approximately 1000° F. to approximately 2350° F. in an initial mixing zone, then subjecting the hydrocarbon gas to a temperature within the limits of approximately 2000° F. to approximately 2650° F. in a reaction zone, blending said gases in a mixing orifice and thereafter subjecting them to further treatment at a temperature within the limits of approximately 2350° F. to approximately 2750° F. in a refining zone, thereafter cooling the gaseous products of said combustion and decomposition by spraying with water to reduce the temperature thereof to approximately 1900° F., thereafter cooling the gases to a temperature within the limits of approximately 425° F. to approximately 450° F., and thereafter separating the carbon black therefrom.

4. A process for producing carbon black from a hydrocarbon gas in an elongated cylindrical chamber, which comprises introducing the hydrocarbon gas into one end of said chamber, introducing air into said chamber at a plurality of spaced ports in the side walls of said chamber, each port arranged to discharge an air stream circumferentially of the said chamber, admixing the hydrocarbon gas in said air streams, regulating the amount of air supplied to the said chamber to provide for combustion of a portion of the hydrocarbon gas to generate sufficient temperatures within said chamber to decompose the unburned portions of the gas, cooling the gaseous products of the combustion and decomposition, and thereafter separating the produced carbon black from said gaseous products.

5. A process for producing carbon black from a hydrocarbon gas in an elongated cylindrical chamber, which comprises introducing a plurality of streams of a hydrocarbon gas into said chamber at one end thereof, introducing air into said chamber at a plurality of spaced points in the side walls of said chamber, said points arranged to discharge the air into the chamber circumferentially thereof to effect a turbulent admixture of the gas and air, burning said gas and air while regulating the amount of air with relation to the amount of hydrocarbon gas to produce combustion of a portion of said gas and the generation of temperatures sufficient to decompose the other portions of said gas, cooling the produced gaseous products, and thereafter separating carbon black therefrom.

6. A process for producing carbon black by the decomposition of a hydrocarbon gas in an elongated cylindrical chamber, which comprises introducing a plurality of streams of a hydrocarbon gas into said chamber at one end thereof, introducing air at spaced points in the side walls of said chamber in selected amounts within the range of approximately 5 to 6.1 parts of air to each part of hydrocarbon gas introduced into said chamber, directing the air circumferentially of the said chamber to provide a turbulent admixture of the air and gas, burning a portion of the said admixture to generate temperatures within the range of approximately 1000° F. to approximately 2750° F. inside said chamber to decompose the unburned portions of said hydrocarbon gas, cooling the resultant gaseous products, and thereafter separating the produced carbon black therefrom.

7. A process as claimed in claim 4 and further characterized in that the gaseous hydrocarbons are subjected to progressive heating and decomposition during their travel through an initial mixing zone, a reaction zone, a mixing orifice and a refining zone within said combustion chamber.

8. A process as claimed in claim 4 and further characterized in that the gaseous hydrocarbons during their travel through said chamber are subjected to progressive heating and decomposition in an initial mixing zone in which the temperature is maintained within the range of approximately 1000° F. to approximately 2350° F., then in a reaction zone in which the temperature is maintained within the range of approximately 2000° F. to approximately 2650° F., then in a mixing orifice, and thereafter in a refining zone in which the temperature is maintained within the range of approximately 2350° F. to approximately 2750° F.

9. A process as claimed in claim 4 and further characterized in that the gaseous hydrocarbons are subjected to progressive heating and decomposition in an initial mixing zone, a reaction zone and a refining zone within said combustion chamber, and the amount of air is regulated within the range of approximately 5 to 6.1 parts of air for each part of hydrocarbon gas supplied to the combustion chamber.

10. A process as claimed in claim 4 and further characterized in that the unburned gaseous hydrocarbons are subjected to progressive heating and decomposition during their passage through said chamber first in an initial mixing zone in which a temperature is maintained within the range of approximately 1000° F. to approximately 2350° F., then in a reaction zone in which the temperature is maintained within the range of approximately 2000° F. to approximately 2650° F., thereafter passing said gases through a mixing orifice to a refining zone in which a temperature is maintained within the range of approximately 2350° F. to approximately 2750° F., and controlling the amount of air admitted to said chamber to provide a total volume of air within the range of approximately 5 to 6.1 parts of air to each part of hydrocarbon gas supplied to the said chamber.

11. A process as claimed in claim 4 and further characterized in that the cooling of the gaseous products of combustion and decomposition is effected by spraying with water to reduce the temperature thereof to a temperature of approximately 1900° F., and the sprayed gases are thereafter cooled to a temperature within the range of approximately 425° to 450° F. before the carbon black is separated therefrom.

HILDING HANSON.
ROBERT W. SKOOG.